United States Patent
Marcet

(10) Patent No.: US 11,130,303 B2
(45) Date of Patent: Sep. 28, 2021

(54) METHOD FOR RETREADING A TIRE USING A DUAL HEATING EFFECT

(71) Applicant: Gregory Marcet, Clermont-Ferrand (FR)

(72) Inventor: Gregory Marcet, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 1026 days.

(21) Appl. No.: 15/106,860

(22) PCT Filed: Dec. 18, 2014

(86) PCT No.: PCT/FR2014/053418
§ 371 (c)(1),
(2) Date: Dec. 11, 2016

(87) PCT Pub. No.: WO2015/097376
PCT Pub. Date: Jul. 2, 2015

(65) Prior Publication Data
US 2017/0129199 A1     May 11, 2017

(30) Foreign Application Priority Data
Dec. 23, 2013   (FR) ..................... 1363429

(51) Int. Cl.
*B29D 30/54*     (2006.01)
*B29C 65/34*     (2006.01)
(Continued)

(52) U.S. Cl.
CPC ............ *B29D 30/54* (2013.01); *B29C 65/348* (2013.01); *B29C 65/3432* (2013.01);
(Continued)

(58) Field of Classification Search
CPC ...... B29D 2030/0674; B29D 2030/544; B29D 2030/546; B29D 2030/548; B29D 30/52;
(Continued)

(56) References Cited

U.S. PATENT DOCUMENTS 3,809,592 A    5/1974   Dennis et al.
3,869,597 A  * 3/1975   Strange .............. G05D 23/2401
                                                  219/497
(Continued)

FOREIGN PATENT DOCUMENTS

AU         82927/75 A      1/1977
AU         82928/75 A      1/1997
(Continued)

OTHER PUBLICATIONS

Electrical resistivity and conductivity, XP007919566, from Wikipedia, redirected from Resistivity.
(Continued)

*Primary Examiner* — Geoffrey L Knable
(74) *Attorney, Agent, or Firm* — Dickinson Wright PLLC

(57) ABSTRACT

The method includes the step of passing an electric current through at least one wire that is situated between a carcass of a tire casing and a tread. The method also includes the step of calculating a value of a temperature of the wire as a function of a relative value of the current. The method proceeds with the step of controlling the current as a function of the temperature value calculated.

2 Claims, 3 Drawing Sheets

(51) Int. Cl.
  *B29C 65/48* (2006.01)
  *B29C 65/50* (2006.01)
  *B29C 65/76* (2006.01)
  *B29C 65/00* (2006.01)
  *B29D 30/56* (2006.01)
  *B29L 30/00* (2006.01)

(52) U.S. Cl.
  CPC ...... *B29C 65/3476* (2013.01); *B29C 65/4815* (2013.01); *B29C 65/5057* (2013.01); *B29C 65/76* (2013.01); *B29C 66/1122* (2013.01); *B29C 66/53245* (2013.01); *B29C 66/73753* (2013.01); *B29C 66/73756* (2013.01); *B29C 66/91411* (2013.01); *B29C 66/91421* (2013.01); *B29C 66/91951* (2013.01); *B29C 66/9592* (2013.01); *B29D 30/56* (2013.01); *B29D 2030/544* (2013.01); *B29D 2030/546* (2013.01); *B29D 2030/548* (2013.01); *B29L 2030/00* (2013.01); *B29L 2030/002* (2013.01)

(58) Field of Classification Search
  CPC ........ B29D 30/54; B29D 30/56; B29C 65/22; B29C 65/222; B29C 65/223; B29C 65/342; B29C 65/3432; B29C 65/3476; B29C 66/91213; B29C 66/91421; G05D 23/2401
  See application file for complete search history.

(56) References Cited

U.S. PATENT DOCUMENTS

| | | | |
|---|---|---|---|
| 3,894,897 A | 7/1975 | Batchelor et al. | |
| 3,922,415 A | 11/1975 | Dexter | |
| 3,933,551 A | 1/1976 | Brodie et al. | |
| 4,123,306 A | 10/1978 | Landry | |
| 4,523,084 A * | 6/1985 | Tamura | G05D 23/2401 219/497 |
| 5,369,247 A * | 11/1994 | Doljack | G05D 23/2401 219/481 |
| 6,630,044 B1 * | 10/2003 | Boling | B29D 30/56 156/87 |
| 7,994,455 B2 * | 8/2011 | Song | H05B 1/0255 219/494 |
| 2011/0056603 A1 * | 3/2011 | Koutoku | B29D 30/52 152/450 |
| 2011/0284520 A1 * | 11/2011 | Fong | H05B 1/0272 219/494 |

FOREIGN PATENT DOCUMENTS

| | | |
|---|---|---|
| CN | 2113872 U | 8/1992 |
| EP | 1 150 831 B1 | 3/2004 |
| FR | 2988644 A1 | 10/2013 |
| GB | 555070 A | 8/1943 |
| GB | 1477317 A | 6/1977 |
| GB | 1592661 A | 7/1981 |
| JP | 2011-42229 A | 3/2011 |
| WO | 99/08860 A1 | 2/1999 |

OTHER PUBLICATIONS

Notification of First Office Action in CN Application No. 201480066570.9 dated Dec. 28, 2016.

* cited by examiner

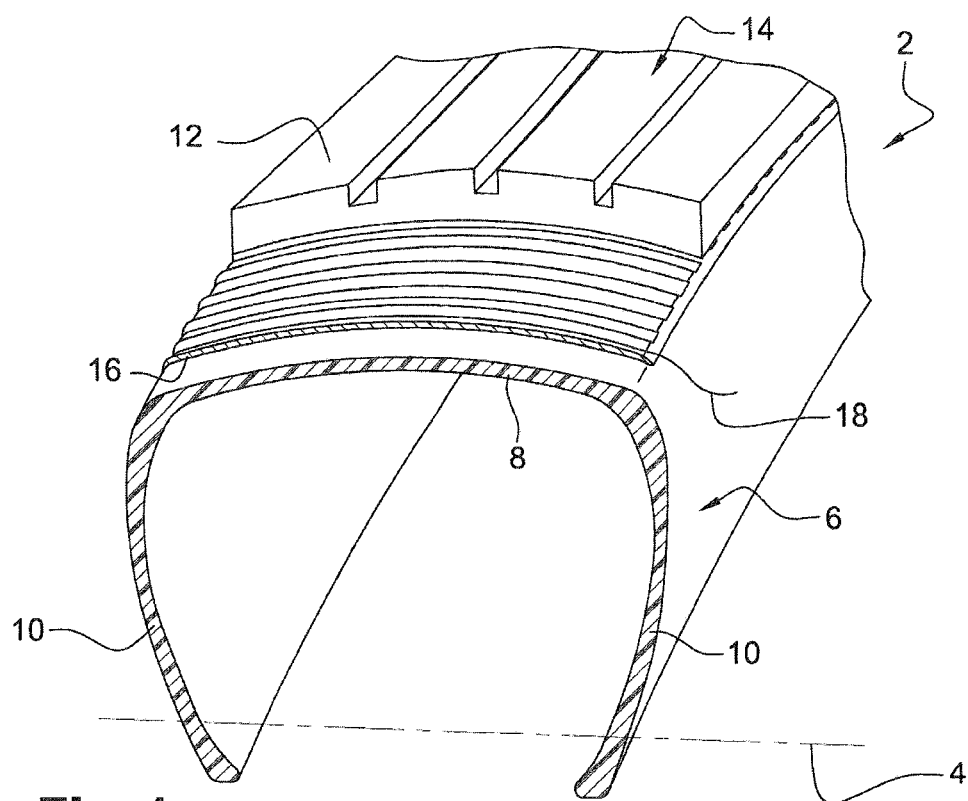
Fig. 1
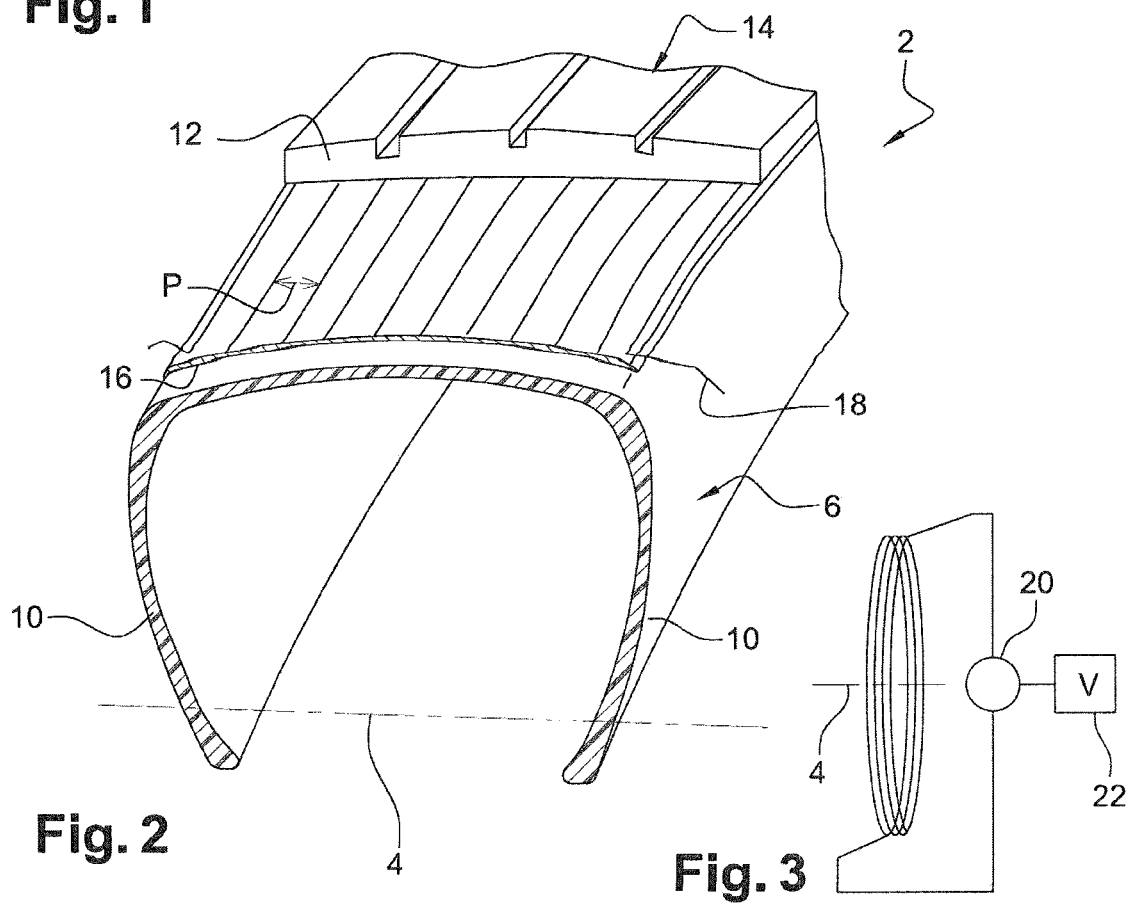
Fig. 2
Fig. 3

METHOD FOR RETREADING A TIRE USING A DUAL HEATING EFFECT

BACKGROUND

1. Field of the Invention

The disclosure relates to the retreading of tires.

2. Related Art

The retreading of a tire casing consists in removing the worn tread from the casing in order to replace it with a tread in good condition, generally new.

To this end, it is known practice to provide, between the carcass and the tread, a hot-melt bonding layer that ensures the adhesion of the tread to the carcass and which softens when it is heated to a predetermined temperature, thereby making it possible to easily separate the tread from the carcass. Similarly, during the fitting of the new tread, the hot-melt layer is heated and then allowed to cool in order to cause the tread to adhere to the carcass.

It is known practice to effect this heating using the Joule effect by means of a metal wire which is contiguous with the bonding layer and through which an electric current passes.

This manner of heating is localized and notably has the aim of saving energy and avoiding overcuring or renewed curing of the casing or certain parts of the casing.

However, even using this manner of local heating, it remains difficult to avoid excessive heating of the rubber, this being likely to damage the latter.

Although it is known practice to use a local measuring point such as a thermocouple in order to monitor the temperature of the bonding layer, fitting such a member is restrictive. In addition, it only provides the temperature at a particular point. However, this point does not correspond to the hottest and thus most sensitive region which is formed by the contour of the portions of heating wire in contact with the rubber.

SUMMARY

It is an aim of the disclosure to further limit the risks of excessively heating the rubber when the tread is removed from the carcass or when a tread is applied to the carcass.

To this end, a method is provided according to the disclosure, wherein:

an electric current is passed through at least one wire situated between a carcass of a tire casing and a tread, a value of a temperature of the wire is calculated as a function of a relative value of the current, and the current is controlled as a function of the temperature value calculated.

The temperature of a metal is determined as a function of its resistivity and its temperature coefficient. Moreover, the resistance of the wire, which is itself correlated with its resistivity, is determined by the voltage and the intensity of the current passing through it in accordance with Ohm's law. Since the characteristics of the metal wire are known, its temperature can be controlled by controlling the current passing through it. It is thus the control of the electric current which makes it possible to control the temperature of the wire and thus that of the bonding layer in real time. This improved control of the temperature limits the risks of overcuring or renewed curing of the rubber.

Preferably, the wire is contiguous with a hot-melt layer.

In one embodiment, the wire is disposed such that it forms crenellated undulations.

Advantageously, the current is passed through at least two wires that form part of one and the same section of a harness.

Thus, by comparison with a single wire harness, with an equal current intensity, the presence of at least two wires makes it possible to reduce the electrical resistance of the harness and the voltage of the current passing through it.

Preferably, the current is controlled such that the temperature value remains below a predetermined threshold.

This avoids raising the temperature of the rubber excessively.

In one embodiment, the current is controlled such that the temperature value undergoes a positive variation exceeding a predetermined threshold during a predetermined period.

In this way, the time for the increase in temperature of the wire and of the bonding layer is reduced. Thus, particularly rapid and local heating of the latter is obtained without the rubber in the vicinity being excessively heated. This operating method also makes it possible to save on cooling time, since the energy thus supplied to the bonding layer at points and locally is subsequently dissipated very quickly by the cold material of the carcass and/or of the tread.

Provision can be made for the tread and the carcass then to be separated.

The disclosure is thus implemented for retreading.

Provision can also be made for the method of the disclosure to form a retreading method during which the tread is fitted on the carcass.

Also provided according to the disclosure is a tire casing which results from a method according to the disclosure.

Also provided according to the disclosure is a tire casing carcass which does not have a tread and which results from a method according to the disclosure.

Finally, a tire casing tread which does not have a carcass and which results from a method according to the disclosure is provided according to the disclosure.

BRIEF DESCRIPTION OF THE DRAWINGS

Embodiments of the disclosure will now be presented by way of non-limiting examples with reference to the appended drawings, in which:

FIGS. 1 and 2 are cutaway perspective views of two tire casings that undergo a method according to the disclosure;

FIG. 3 is a view of an electric circuit used during the retreading of the casing in FIG. 2, FIGS. 4 and 5 are curves showing the change in the various variables during the implementation of the method of the disclosure on the casings in FIGS. 1 and 2.

DETAILED DESCRIPTION

Figure 4:
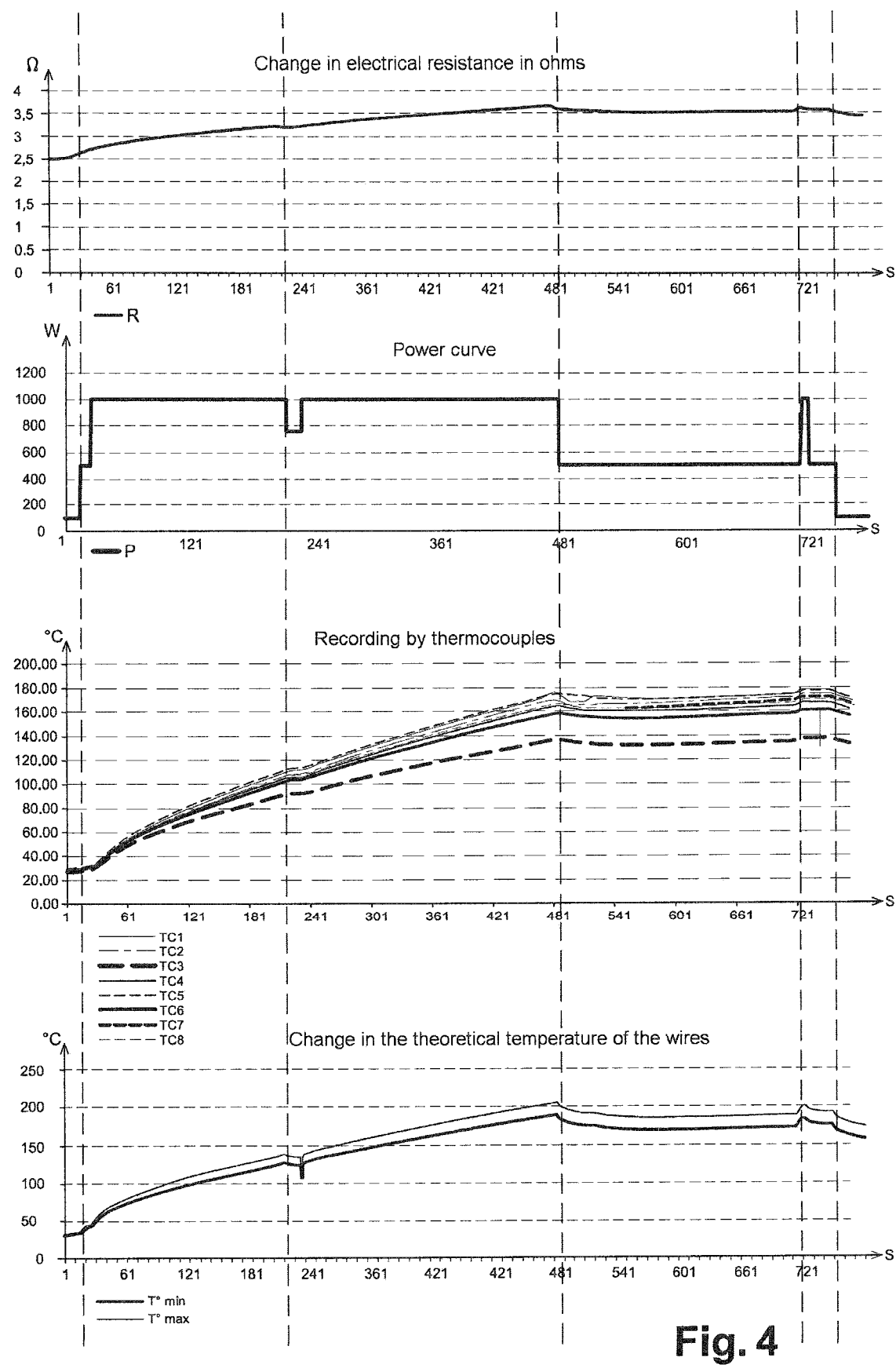

FIG. 1 illustrates a first embodiment of a wheel tire casing 2 that undergoes a retreading method according to the disclosure. The casing has a toroidal overall shape of axis 4. It comprises a carcass 6 having a crown layer 8 and two lateral sidewalls 10. The carcass has a profiled shape, the cross section of which has a "U" shape.

The casing comprises a tread 12 fastened to the carcass 6 on an external face of the crown layer 8. The tread 12 bears tread patterns and furrows on its external face 14, the detailed form of which has not been illustrated.

Interposed between the carcass and the tread is a bonding layer 16 made of a hot-melt material that ensures the adhesion of the tread to the carcass at ambient temperature but is able to soften when it is brought to a predetermined temperature for allowing the tread to be separated from the carcass.

A hot-melt material is understood to be a material that is able to soften when it is heated in order to be brought to a predetermined temperature that is characteristic of the material, known as the softening temperature. For example, such a material can be chosen from thermoplastic elastomers such as SBS (styrene-butadiene-styrene) or SIS (styrene-isoprene-styrene). For the purposes of the disclosure, reference is made to a hot-melt material that is capable of softening at a temperature of between 140° C. and 200° C.

The casing also comprises a metal wire 18 contiguous with the bonding layer. In the present example, this wire extends in contact with an upper face of the layer 16 and an inner face of the tread. In this case, it has crenellated undulations or boustrophedonic undulations such that it crosses the entire width of the tread and the bonding layer from one sidewall 10 to the other and then, having travelled a short distance in the circumferential direction, travels in the direction of the other sidewall again. In this way, the wire 18 extends around the entire circumference of the carcass. It forms rectilinear portions that each extend in a radial plane with respect to the axis 4, these portions being separated by a constant pitch in the circumferential direction.

It is now assumed that the tread 12 of this casing is worn and needs to be replaced. The retreading operation is thus implemented as follows.

For this, with the two ends of the wire 18 being accessible, they are connected to electric power supply means 20 such as those illustrated in FIG. 3 with reference to the second embodiment.

The passage of the current causes the wire to be heated by the Joule effect. The heat thus generated diffuses through the bonding layer 16 which, on reaching the abovementioned temperature, softens.

The tread can then be easily separated from the carcass. It is assumed in the following that the bonding layer 16 and the wire 18 remain on the carcass during this operation.

During a subsequent step, a new tread 12 is used. In this case, this is a tread made of cured rubber which is configured in the form of an open ring. Thus, the tread is wound up in order to apply it to the assembly formed by the carcass, the bonding layer and the wire.

However, use could be made of a tread configured in the form of a closed ring and said tread could be disposed in such a configuration on the carcass by means of a suitable tool known per se.

Next, pressure is applied to the tread in order to press it against the bonding layer and the carcass. This pressure is for example between 2 and 3 bar, i.e. between 2 and 3×10$^5$ Pa. During this time, an electric current is once again passed through the wire 18 in order to heat it by the Joule effect and in this way heat the bonding layer 16 until it reaches its softening temperature. The bonding layer thus becomes plastic and passes into close contact with the tread.

The current is then interrupted and the assembly is allowed to cool. By returning to the solid state, the bonding layer ensures the adhesion of the tread to the carcass.

If the bonding layer 16 and the wire 18 are eliminated with the worn tread, the same method can be implemented either by disposing a new bonding layer and a new wire on the carcass before the tread is installed, or by fitting a tread that is itself equipped with the bonding layer and the wire.

The casing of the second embodiment illustrated in FIGS. 2 and 3 only differs from that in FIG. 1 by the configuration of the wire. Specifically, this time, the wire 18 forms turns around the axis 4, the successive turns being separated from one another by a variable pitch p in the direction of this axis. The turns are distributed between the sidewalls. The rest of the method is implemented in the same manner as for the casing in FIG. 1.

In these two embodiments, the configuration of the wire allows uniform heating of the bonding layer by controlling notably the temperature difference between the regions situated between the portions of the wire and those contiguous with the wire.

Figure 6:
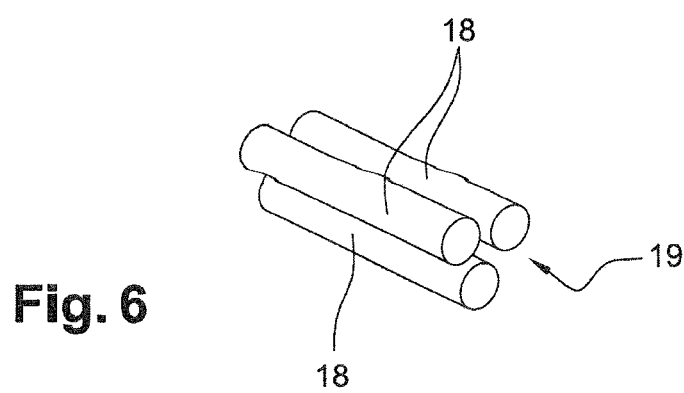
FIG. 6 illustrates the wires used in one embodiment.

With reference to FIG. 6, instead of a single wire used in the embodiments in FIGS. 1 and 2, use can be made of a harness 19 comprising several wires 18 in one and the same section, for example two or three thereof. For one and the same current intensity, this arrangement makes it possible to reduce the electrical resistance of the conductors and thus the electric voltage of the current.

The manner in which the wire is supplied with power in each of these embodiments will now be explained in accordance with one embodiment of the disclosure.

The member 20 is configured to allow a variable power supply in terms of current and/or voltage. To this end, it comprises control means 22.

In this case, use is made of a DC power supply. It should also be recalled that the resistance R of the wire obeys Ohm's law:

$$U=RI$$

where U and I denote the voltage at the terminals of the wire and the intensity of the current passing through it, respectively.

It is moreover known that the resistivity of a metal at any temperature T is given by the following law:

$$\rho=\rho_0(1+\alpha T)$$

where:
$\rho_0$ is the resistivity of the metal at 0° C., and
$\alpha$ is its temperature coefficient.

It is assumed that the resistivity of the heating wire at 0° C. and its temperature coefficient are known. Thus, its resistivity and consequently its resistance R as a function of the temperature T are known.

Moreover, the intensity, the voltage and the power of the electric current are known in real time during the heating process.

It is thus possible to calculate the temperature T at the core of the heating wire in real time by means of at least one of the variables U and I that characterize the current.

In the present example, the means 22 are configured and programmed to carry out this calculation in real time. Thus, the current is controlled by means of the member 20 while the calculated temperature T at the core of the wire is monitored and updated in real time.

It is thus possible to permanently check that a predetermined temperature threshold is not exceeded so as not to damage the rubber. This threshold is set for example at 180° C. or 200° C.

In the present embodiment, while complying with this latter setpoint, the current is also controlled such that the temperature value T undergoes a positive variation exceeding a predetermined threshold during a predetermined period. In other words, the temperature is increased drastically for a short period. It is a question for example of increasing the temperature from 25° C. to 175° C., i.e. a variation of 150° C., in 500 seconds or less. In this way, the time for the increase in temperature of the wire and thus of the bonding layer situated in the vicinity is optimized. Particularly rapid and local heating is obtained in this way, thereby also avoiding exposing the surrounding rubber to an excessively high temperature for too long a period. This embodiment also makes it possible to save on cooling time for the bonding layer, since the energy thus supplied to the latter at points and locally is dissipated very quickly in the surrounding cold material of the casing.

Figure 5:
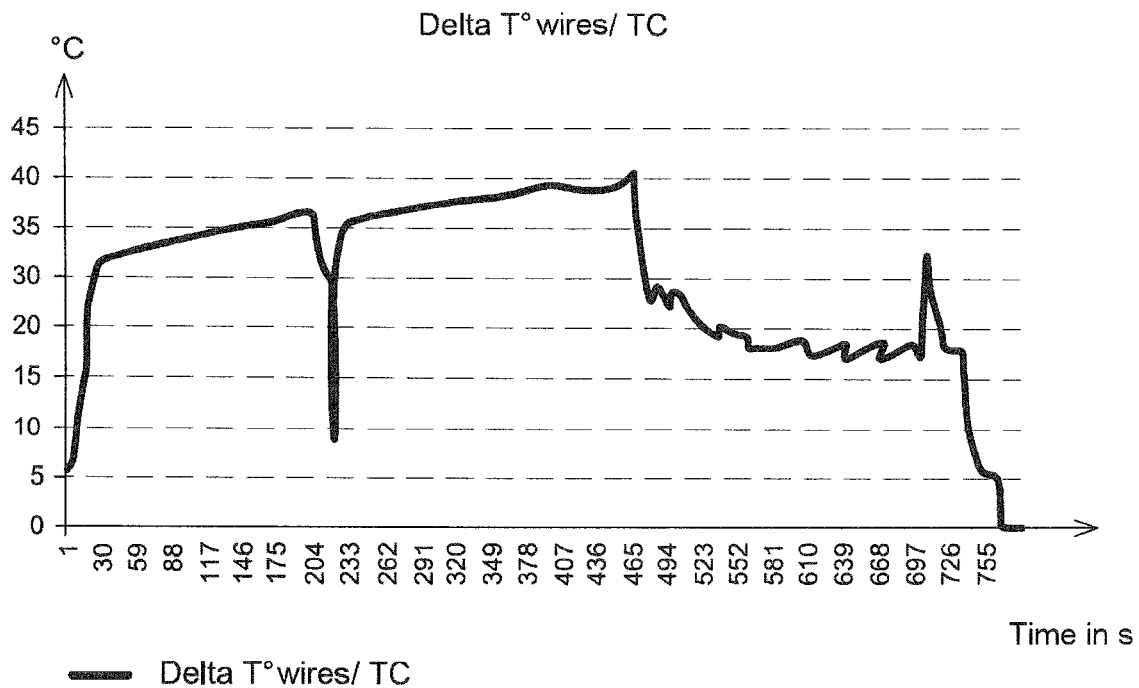

Experimental results are illustrated in FIGS. 4 and 5. All of the curves cover the same period indicated on the x-axis, of around 800 seconds. This is the phase in which the temperature of the casing rises.

The first curve shows the change in the electrical resistance R of the wire 18 in ohms. It can be seen that the resistance varies moderately between 2.5 and 3.5 ohms.

The second curve shows the change in the electric power supplied to the heating element. It can be seen that drastic variations in the power supplied are effected so as to visualize in the other curves the response of the system in terms of temperature and resistance.

The third graph illustrates the curves that give the temperature values provided by eight thermocouples situated at different locations on the bonding layer.

The fourth graph shows the change in the temperature T of the wire as calculated as a function of the ohmic resistance, of the resistivity of the wire and of its temperature coefficient. Two separate curves show a minimum value and a maximum value so as to take into account measurement errors by the apparatus used.

It can be seen that the temperature of the bonding layer, illustrated by the curves in the third graph, closely follows the slow and rapid variations in the temperature of the heating wire illustrated in the fourth graph. However, there is a temperature difference between the two which is illustrated by the graph in FIG. 5 and which is a function of the power supplied by the wire.

These tests thus show that it is possible to determine good estimates of the temperature of the wire and of the bonding layer from variables of the electric power and thus to avoid excessive heating of the rubber and the heating wire. Of course, numerous modifications may be made to the disclosure without departing from the scope thereof.

The invention claimed is:

1. A method of retreading a tire, comprising the steps of:
preparing a tire which includes at least one wire situated in a bonding layer between a carcass of a tire casing and a tread of a first tire;
to determine a predetermined period, experimentally passing an electric current through the at least one wire and varying a power supplied to the at least one wire while simultaneously
  monitoring a resistance of the at least one wire,
  monitoring temperatures at different locations on the bonding layer,
  monitoring a calculated temperature of the at least one wire, and
  monitoring a difference between the temperature of the bonding layer and the calculated temperature of the at least one wire;
passing an electric current through at least one wire that is situated between a carcass of a tire casing and a tread of a second tire,
calculating a value of a temperature of the wire as a function of a relative value of the current,
controlling the current as a function of the calculated temperature value, and
wherein the current is controlled such that the temperature value undergoes a positive variation exceeding a predetermined temperature variation threshold during the predetermined period such that a predetermined threshold temperature is not exceeded and a rubber of the tire tread is not damaged.

2. The method as set forth in claim 1 wherein the current is controlled such that the temperature value varies at a rate that is 0.3° C. per second or greater.

* * * * *